United States Patent [19]

Piper et al.

[11] 4,153,286

[45] May 8, 1979

[54] TOOL FOR HANDLING HANGING PLANTS

[76] Inventors: John L. Piper, 1948 Meadow Dr., Springfield, Mo. 65804; John R. Peterson, 778 W. Vest, Marshall, Mo. 65340

[21] Appl. No.: 851,368

[22] Filed: Nov. 14, 1977

[51] Int. Cl.² ............................................. A47F 13/06
[52] U.S. Cl. .................................... 294/19 R; 294/24
[58] Field of Search ............... 294/19 R, 24, 26, 1 R, 294/20, 21, 22, 23, 33, 99 R

[56] References Cited

U.S. PATENT DOCUMENTS

| 103,627 | 5/1870 | Lamb | 294/24 |
|---|---|---|---|
| 650,589 | 5/1900 | Randle | 294/24 |
| 1,512,315 | 10/1924 | Sandford | 294/24 |
| 1,801,813 | 4/1931 | Martin | 294/19 R |

*Primary Examiner*—James B. Marbert
*Attorney, Agent, or Firm*—Lowe, Kokjer, Kircher, Wharton & Bowman

[57] ABSTRACT

A tool used to lift a hanging type plant onto and off of an overhead hook. The tool includes an elongate shaft having a handle at one end and a V-shaped tip at the other end which is formed to engage a ring carried on the upper end of ropes that suspend the plant container. The ring may be held on the tip of the tool and thereby lifted onto and off of the hook.

3 Claims, 2 Drawing Figures

U.S. Patent  May 8, 1979  4,153,286

TOOL FOR HANDLING HANGING PLANTS

BACKGROUND AND SUMMARY OF THE INVENTION

This invention relates generally to the handling of hanging plants and deals more particularly with a tool which may be used to lift a plant container onto and off of an overhead hook.

Although hanging type plants have achieved considerable popularity, they are difficult to handle due to their normal manner of suspension from a ceiling mounted hook or the like. Typically, the plant container is suspended on ropes carrying a ring on their upper ends which fits on the hook. Since the hook is normally too high to reach by hand, substantial difficulty is encountered in lowering the plant from the hook and in replacing it thereon.

It is therefore the principal goal of the present invention to provide a tool which facilitates the handling of hanging type plants.

More specifically, it is an object of the invention to provide a tool that is adapted to lift the ring of the plant suspension assembly onto and off of an overhead hook structure or the like.

Another object of the invention is to provide a tool of the character described which is able to firmly hold the ring in a manner to prevent it from inadvertently slipping off of the tool. In this respect, the V shaped tip is important because it retains the ring in a stable manner when the tool is held in any of a variety of orientations.

A further object of the invention is to provide a tool of the character described which is simple and economical to construct, which may be quickly and easily used, and which is adapted for use with hooks located at various heights.

Other and further objects of the invention, together with the features of novelty appurtenant thereto, will appear in the course of the following description.

DETAILED DESCRIPTION OF THE INVENTION

Figure 1:
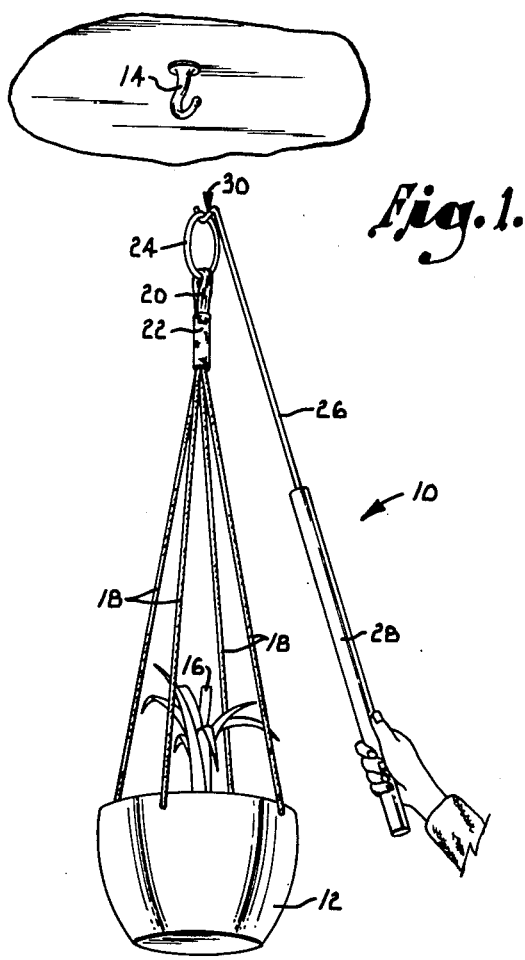
Figure 2:
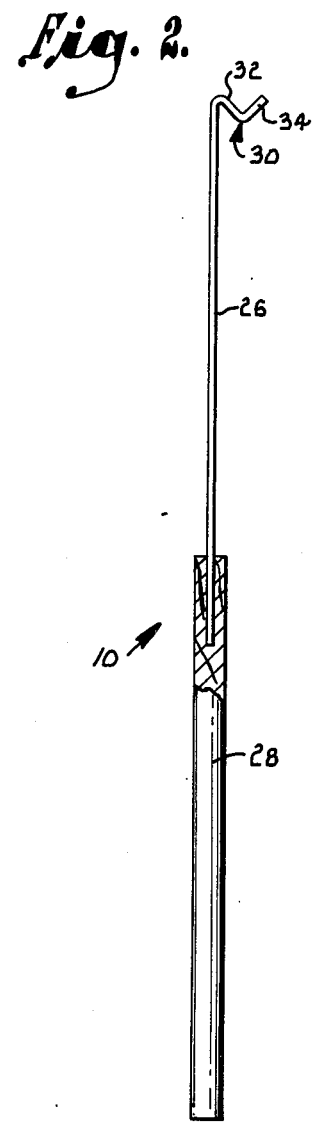

In the accompanying drawing which forms a part of the specification and is to be read in conjunction therewith and in which like reference numerals are used to indicate like parts in the various views:

FIG. 1 is a perspective view showing a tool constructed according to the present invention being used to lift a hanging type plant onto a ceiling mounted hook; and FIG. 2 is a side elevational view of the tool, with a portion of the handle shown in cross section for illustrative purposes.

Referring now to the drawing in detail and initially to FIG. 1, numeral 10 generally designates a tool which may be used to handle a hanging plant container 12 of the type normally suspended from a ceiling mounted hook 14. The container 12 contains a plant 16 and is provided with a number of ropes 18 which are connected with the container near its upper edge. The ropes 18 converge at their upper ends and are held in a loop 20 by a sleeve member 22. Loop 20 is connected with a metal ring 24 which fits on hook 14 to suspend the plant container 12 at an elevated position above the floor.

Tool 10 has an elongate metal shaft 26 which extends into and is connected with a cylindrical wooden handle 28 at one end. Handle 28 is preferably long enough to make up approximately one half of the overall length of tool 10. Shaft 26 is a straight member having on the end opposite handle 28 a V-shaped tip structure 30. The tip includes a first leg 32 which connects with the end of shaft 26 in a curved manner and which inclines generally outwardly to one side of the shaft and toward the handle end. At the base of the V, a second leg 34 connects with leg 32 an inclines generally upwardly therefrom. Shaft 26 and the entirety of tip 30 occupy a single plane in order to simplify manufacture of the tool and avoid any compound bends or the like. The recess presented within the V and between the upwardly diverging legs 32 and 34 opens upwardly so that it is able to receive ring 24 with shaft 26 oriented generally vertically.

In use, tool 10 serves to lift ring 24 onto and off of hook 14. When the ring is to be fit on the hook, it is inserted in the notched recess of the V-shaped tip of the tool such that the upper part of ring 24 rests on top of the base area at the intersection of legs 32 and 34. Handle 28 is held in the hand as shown in FIG. 1, and the tool is raised until ring 24 is high enough to be inserted on hook 14, after which the tool is withdrawn.

The hanging plant may be lowered from hook 14 by raising the tool such that the V-shaped tip 30 engages the upper part of ring 24. The ring is then lifted and moved to the side until it is free of hook 14, whereupon the tool is lowered in order to lower the plant.

It is noted that the shape and orientation of the tip structure 30 permits the hanging plant to be easily handled with shaft 26 oriented vertically or at a considerable angle from vertical. Consequently, the tool may be used with hooks located at various elevations without the possibility of ring 24 slipping off of tip 30 as the ring is being installed on or removed from the hook. Moreover, due to the tapered nature of the recess presented by the V-shaped tip 30, rings of various sizes can be firmly held on the tool without slipping or otherwise shifting on the tip. Handle 28 provides a convenient grip, and its length permits it to be held at various locations such that the effective length of the tool between the hand and tip 30 can be varied in order to accommodate hooks located at various heights.

It is to be understood that tool 10 may be used with devices other than the hook 14 and ring 24 shown in the drawing, and that various types of hanging plants may be handled.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawing is to be interpreted as illustrative and not in a limiting sense.

Having thus described the invention, we claim:

1. A tool for handling a plant container of the type adapted to be suspended from an overhead bracket element by means of a bracket engaging member coupled with the plant container, said tool comprising:

a handle adapted to be gripped in the hand;

an elongate shaft secured to said handle in extension therefrom; and a generally V shaped tip structure for receiving said bracket engaging member, said tip structure including a pair of substantially straight leg members cooperating to present the general shape of a V, said tip structure being located on the end of said shaft remote from said handle such that one leg member of said tip structure is coupled with said shaft so as to form an acute angle therewith, and said leg members intersecting at a selected angle at the base of the V to form a sharp notch between said leg members sized to closely receive said bracket engaging member, whereby said bracket engaging member is closely held in said notch in engagement with each leg member.

2. A tool as set forth in claim 1, wherein said handle and shaft are approximately equal in length and said handle is substantially uniform along its length.

3. A tool as set forth in claim 1, wherein said leg members are substantially coplanar.

* * * * *